United States Patent [19]

Wakefield

[11] 4,154,870
[45] May 15, 1979

[54] SILICON PRODUCTION AND PROCESSING EMPLOYING A FLUIDIZED BED
[75] Inventor: Gene F. Wakefield, Richardson, Tex.
[73] Assignee: Texas Instruments Incorporated, Dallas, Tex.
[21] Appl. No.: 872,528
[22] Filed: Jan. 26, 1978

Related U.S. Application Data

[63] Continuation of Ser. No. 684,510, May 7, 1976, abandoned, which is a continuation of Ser. No. 520,078, Nov. 1, 1974, abandoned.

[51] Int. Cl.$^2$ ............................................. C01B 33/02
[52] U.S. Cl. ................................ 427/8; 118/DIG. 5; 222/4; 423/350; 427/213; 427/215
[58] Field of Search ................ 222/4; 423/350; 427/8, 427/213, 215; 118/DIG. 5

[56] References Cited

U.S. PATENT DOCUMENTS

| | | | |
|---|---|---|---|
| 3,012,862 | 12/1961 | Bertrand et al. | 427/213 |
| 3,053,648 | 9/1962 | Stephens et al. | 427/213 |
| 3,215,522 | 11/1965 | Kuhlmann | 423/350 |
| 3,672,980 | 6/1972 | Glendinning et al. | 427/8 |

Primary Examiner—John D. Smith
Attorney, Agent, or Firm—James T. Comfort; Gary C. Honeycutt

[57] ABSTRACT

The disclosure relates to formation of polycrystalline silicon by the fluid bed process wherein seed crystals of silicon are entered into the reactor from the bottom thereof and by means of a pressurized feed, the product being removed from the reactor through a tube entering the reactor at its bottommost portion. The removed product passes through a closed line by gravity into a closed vessel, the vessel being movable to a crystal puller apparatus without handling or exposure. The closed line is also tapped, as desired, to remove product on-line for test during operation so that the system can be immediately shut down when improper product is detected without excessive loss of pure polycrystalline silicon. The polycrystalline silicon is fed from the transfer vessel to a melt from which crystals are to be pulled via an intermediate reservoir. The silicon is transferred from the vessel to the reservoir under pressure to prevent contamination thereof.

7 Claims, 2 Drawing Figures

Fig. 1
Fig. 2
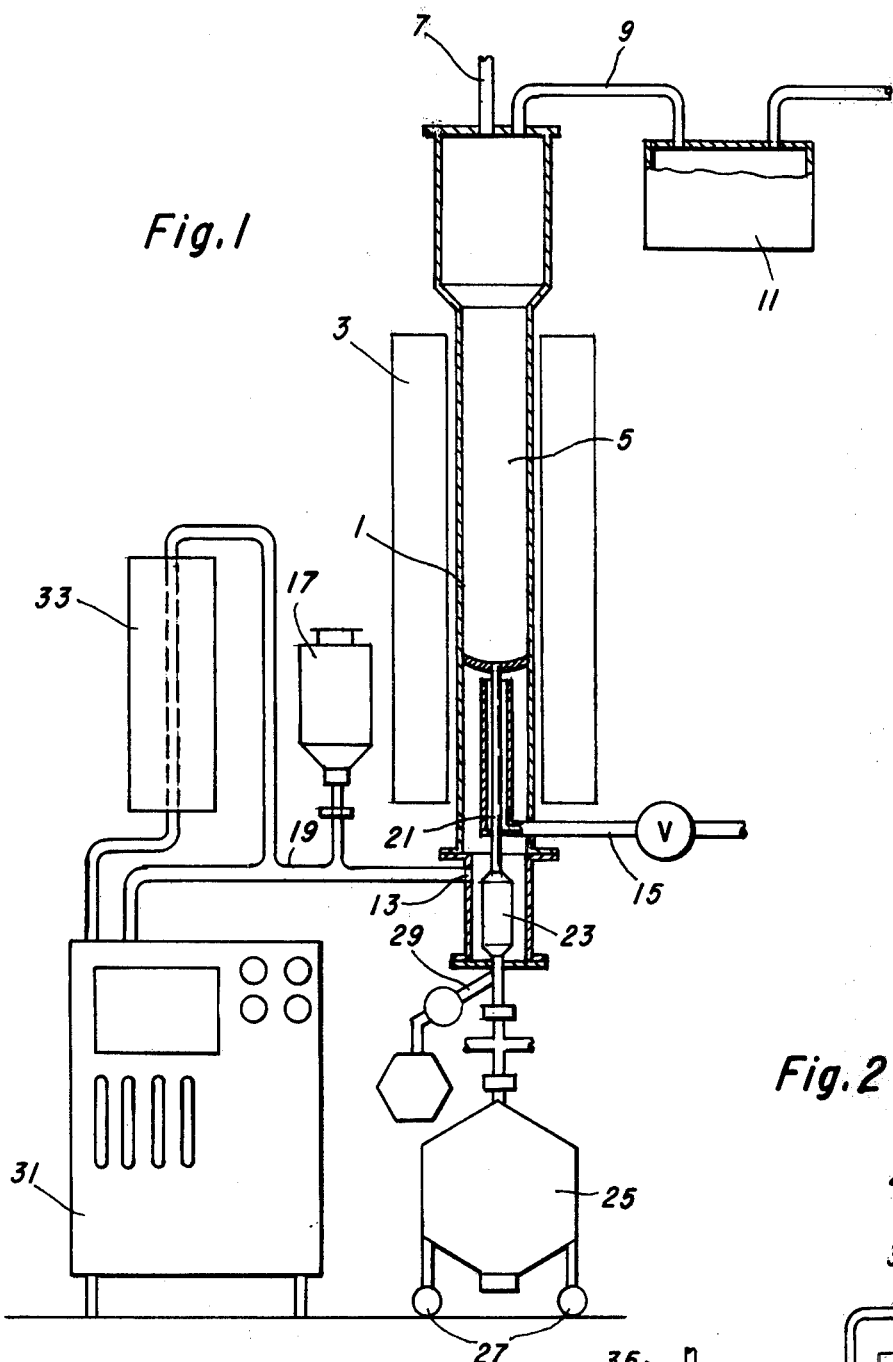
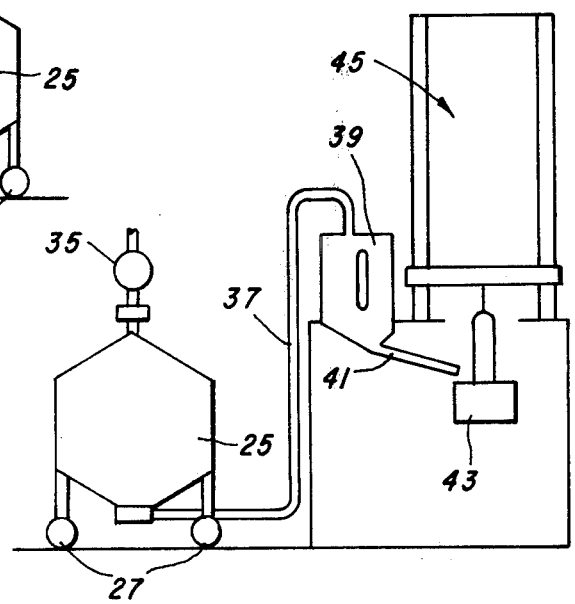

SILICON PRODUCTION AND PROCESSING EMPLOYING A FLUIDIZED BED

This is a continuation of application Ser. No. 684,510, filed May 7, 1976 which was a continuation of Ser. No. 520,078 filed on November 1, 1974 now abandoned.

This invention relates to a method and apparatus for providing high purity silicon for use in semiconductor applications and, more specifically, to a method and apparatus for providing pure polycrystalline silicon particles by an improved fluidized bed process.

During the history of production of semiconductor grade silicon by chemical vapor deposition reactions, the "filament type" deposition unit has been most widely used. In it, the reactive gases are contacted with a resistively heated starting rod which grows in diameter as deposition of silicon occurs. Although such reactors were developed in a fairly straightforward manner from the early "hot wire" reactor utilized in the production of high-purity materials, they have several disadvantages; and in particular, they are relatively slow and uneconomical. A preferred method of producing semiconductor grade silicon is to utilize a fluidized bed deposition of silicon on seed particles. The fluidized bed reactor has many advantages for the chemical vapor deposition reactions, particularly improved energy utilization and material economy. In accordance with the fluidized bed reactor process for the preparation of semiconductor grade silicon, a mixture of silicon halides, such as trichlorosilane and silicon tetrachloride and hydrogen is fed to the reactor to fluidize a bed of growing silicon seed particles which are continuously or semi-continuously added and withdrawn. Continuity of operation, the large surface area of the fluidized particles, and the efficiency of exposure of surface to the reactant gas stream are major factors in the above-mentioned economy of the fluidized bed reactor. Improved product quality is also provided as one of the unique attributes of the fluidized bed in the fact that with proper bed turbulence, the exposure of individual particles to the reactant stream is averaged out. This effect eliminates variation of composition with degree of reactant depletion such as may occur from end to end, or from core to periphery of the silicon rods produced in the present reactors. Further, the continuity of operation has the potential of eliminating or greatly reducing the compositional effects associated with the cyclical turn-around of the present batch reactor. Preferred fluidized bed reactors are described in detail in co-pending patent applications, Ser. No. 834,210 by Gene F. Wakefield et al, entitled "Method of Silicon Production," having an effective filing date of May 13, 1974 and Ser. No. 469,177 by Gene F. Wakefield entitled "Closed Cycle Silicon Processor," filed also on May 13, 1974.

The product removed from the fluidized bed reactor is in particulate form which, for example, is gradually classified to the bottom of the fluidized bed reactor when the particles grow to sufficient size to overcome the force of the fluid flow within the reactor. The size of the particles depends to a large extent upon the rate of fluid flow and may range in particle size up to a ½ inch in diameter. The particles may be continuously removed from the bottom of the reactor by suction, pressure, gravity flow, or other mechanical means.

The prior art fluidized bed reactors, however, have been subject to several deficiencies. Typical reactors have been large, on the order of two to three floors in height, thereby requiring operators to continually travel up and down three floors of stairs during reactor operation. This is obviously time consuming and tiring. Furthermore, the introduction of seed crystals of silicon into the reactor has been difficult. Seed crystals, while normally about one-to-ten thousandths of an inch in diameter, are not rounded and can assume various jagged shapes with sharp points. Therefore, since these seed crystals are entered into the reactor by gravity feed, the crystals tended to pack up on each other and clog up inlet ports even up to ¼ inch in diameter. This clogging caused stoppage of what otherwise could be a continuous operation. A still further problem encountered in prior art fluid bed processes is the fact that there is no capability for on-line testing of the output from the fluidized bed. The testing could only be done after completion of the operation, thereby resulting in great product loss until a defective operation was noted and corrected. A final problem of prior art fluid bed processes is that the resulting silicon is subject to contamination between formation thereof and final use in standard crystal pulling operations.

In accordance with the present invention, the above-noted problems of the prior art are substantially overcome. Briefly, the above is accomplished in accordance with the present invention by entering seed crystals into the reactor from the bottom thereof and by means of a pressurized feed, the product being removed from the reactor through a tube entering the reactor at its bottommost portion. The removed product passes through a closed line by gravity into a closed vessel, the vessel being movable to a crystal puller apparatus without handling or exposure. The closed line is also tapped, as desired, to remove product on line for test during operation so that the system can be immediately shut down when improper product is detected without excessive loss of pure polycrystalline silicon. The polycrystalline silicon is fed from the transfer vessel to a melt crucible from which crystals are to be pulled via an intermediate reservoir. The silicon is transferred from the vessel to the reservoir under pressure to prevent contamination thereof. The above-described process results in a reactor requiring a height approximately two thirds that of prior art reactors, thereby saving space as well as operator time.

It is therefore an object of this invention to provide a method and apparatus for providing polycrystalline silicon wherein seed particles are entered into the reactor from the bottom of the bed in a fluidized bed process.

It is a further object of this invention to provide a method and apparatus for formation of polycrystalline silicon by the fluidized bed procedure wherein the entry of seed crystals into the reactor is not impeded by clogging.

It is a still further object of this invention to provide a method and apparatus for formation of polycrystalline silicon by the fluidized bed procedure wherein a pressurized feed of seed crystals is provided at the bottom of the fluidized bed.

It is yet a further object of this invention to provide a method and apparatus for formation of polycrystalline silicon by the fluidized bed procedure wherein the output product of the reactor is continuously tested on-line during operation.

It is an even further object of this invention to provide a method and apparatus for formation of polycrystalline silicon by the fluidized bed procedure wherein the reactor output is transferred to a movable, closed transfer vessel.

The above objects and still further objects of the invention will immediately become apparent to those skilled in the art after consideration of the following preferred embodiment thereof, which is provided by way of example and not by way of limitation, wherein:

FIG. 1 is a schematic diagram of a fluid bed reactor system in accordance with the present invention; and FIG. 2 is a schematic diagram of a standard crystal puller for use with the system of the present invention.

Referring now to FIG. 1, there is shown a system for forming polycrystalline silicon by the fluid bed process in accordance with the present invention. The system includes a fluid bed reactor 1 having a heating element 3 external thereof for heating the reaction zone of the reactor to a temperature of about 750°–1350° C. and preferably about 1000° C. and a bed 5 of silicon particles at the lower region or reaction zone of the reactor, all of this being conventional. The reactor 1 includes a port 7 for viewing within the reactor and exhaust port 9 which passes through a settling tank 11 for removal of exhaust gases from the reactor. The reactor includes an inlet port 13 through which a silicon halide such as silicon chloride, silicon bromide or silicon iodide is entered into gaseous form into the fluidized bed 5. A reactor includes a further inlet port 15 through which hydrogen is entered into the lower region of the bed 5 to cause turbulence in the bed as well as to react with the silicon halide to form hydrogen halide gas which passes out through port 9 and elemental silicon which deposits on the silicon particles in the bed 5 to enlarge the size of the particles.

Seed particles of silicon having a particle size of about $10^{-2}$ inches in diameter, but of irregular shape are fed into the bottom of the bed 5 from a storage region 17 under pressure from a pressure source 19. A pressure in the range of about 15 to 20 pounds is desired. The seed particles enter into the reactor 1 under pressure via apertures (not shown) formed at the base of the reactor which are large enough for entry of seed particles but not too large to permit larger particles to fall therethrough.

As is well known, the large particles of polycrystalline silicon fall to the bottom of the bed and are withdrawn therefrom via outlet 21 which has an enlarged region 23 to a transfer vessel 25 having an inert atmosphere therein. The vessel 25 has wheels 27 so that it can be physically moved without contaminating the polycrystalline silicon therein. An outlet port 29 is provided near the outlet from region 23 for removal of polycrystalline silicon for on-line sampling. A control panel 31 controls the pressure as well as feed rate of all feed materials and of the seed particles from storage region 17 via pressure source 19, the gas providing the pressure being heated while traveling through heater 33. The heater 33 is used to vaporize liquid silicon halides into the inlet reactant stream. A desirable pressure will provide a velocity of about 200 cm/sec to the silicon seed particles in the gas stream.

The system described in FIG. 1 provides a continuous system for providing polycrystalline silicon, the process requiring heating the reaction zone to the desired temperature, entering seed particles of silicon therein under pressure at the base of the bed 5 and then entering hydrogen and a silicon halide into the bed to form larger polycrystalline silicon particles. The larger particles fall to the bottom of the bed and are removed to a transfer vessel having an inert atmosphere with provision for on-line testing of the polycrystalline silicon removed from the reactor.

The transfer vessel 25 when filled with polycrystalline silicon is transferred to a crystal puller system as shown in FIG. 2. A pressure source 35 of an inert gas is attached to the vessel 25 to force the silicon through pipe 37 to a feed reservoir 39. The silicon, still under pressure, is then fed from the reservoir 39 through line 41 to the melt tank 43 from which single crystal silicon rods are pulled by puller 45 in a standard manner.

Though the invention has been described with respect to a specific embodiment thereof, many variations and modifications will immediately become apparent to those skilled in the art. It is therefore the invention that the appended claims be interpreted as broadly as possible in view of the prior art to include all such variations and modifications.

What is claimed is:

1. In a process for producing elemental silicon in a high state of purity including the steps of:
    fluidizing with hydrogen a bed of finely divided particles of pure elemental silicon within a reaction zone maintained at from 750°–1350° C.;
    passing a vaporous silicon halide reactant stream through a conduit leading into the fluidized bed for reaction with a portion of said hydrogen, the halogen component being taken from the group consisting of a chloride, a bromide and an iodide, to deposit the resulting silicon reaction product on said product;
    removing vaporous reaction products from said reaction zone; and
    separately recovering the resulting larger-sized silicon particles formed in said zone; the improvement comprising:
    (a) pressurizing said reactant stream to 15 to 20 p.s.i. in said conduit;
    (b) semi-continuously adding seed crystals of silicon to said pressurized stream; then
    (c) passing the seed-containing reactant stream to a mixing chamber below the bottom region of said fluidized bed where it is combined with said hydrogen; and
    (d) passing the combined streams into said reaction zone through apertures sufficiently small to prevent larger particles from falling through.

2. A process as set forth in claim 1 wherein said seed crystals are added under pressure.

3. A process as set forth in claim 1 wherein said seed crystals are about $10^{-2}$ inches in diameter.

4. A process as set forth in claim 2 wherein said seed crystals are about $10^{-2}$ inches in diameter.

5. A process as set forth in claim 2 wherein said pressure is from about 15 to 20 pounds.

6. A process as set forth in claim 4 wherein said pressure is from about 15 to about 20 pounds.

7. A process as set forth in claim 1 further including the step of on-line testing of the recovered larger sized silicon.

* * * * *